(12) United States Patent
Ito et al.

(10) Patent No.: US 6,596,065 B2
(45) Date of Patent: Jul. 22, 2003

(54) BLACK INK SET AND INK JET RECORDING METHOD USING THE SAME

(75) Inventors: Jun Ito, Nagano-Ken (JP); Miharu Kanaya, Nagano-Ken (JP)

(73) Assignee: Seiko Epson Corporation, Tokyo (JP)

( * ) Notice: Subject to any disclaimer, the term of this patent is extended or adjusted under 35 U.S.C. 154(b) by 175 days.

(21) Appl. No.: 09/917,284

(22) Filed: Jul. 27, 2001

(65) Prior Publication Data

US 2002/0051046 A1 May 2, 2002

(30) Foreign Application Priority Data

Jul. 28, 2000 (JP) ........................................ 2000-229852

(51) Int. Cl.$^7$ .............................................. C09D 11/02
(52) U.S. Cl. ................. 106/31.47; 106/31.27; 106/31.6
(58) Field of Search ......................... 106/31.47, 31.27, 106/31.6; 347/100

(56) References Cited

U.S. PATENT DOCUMENTS

| | | | |
|---|---|---|---|
| 5,368,637 A | 11/1994 | Bauer et al. | 106/31.43 |
| 5,725,641 A | 3/1998 | MacLeod | 106/31.5 |
| 5,888,284 A * | 3/1999 | Engel | 106/31.27 |
| 6,234,601 B1 * | 5/2001 | Hayashi et al. | 347/16 |
| 6,481,841 B1 * | 11/2002 | Blease et al. | 347/100 |

FOREIGN PATENT DOCUMENTS

| JP | 10130557 | 5/1998 |
|---|---|---|
| JP | 00044851 | 2/2000 |

OTHER PUBLICATIONS

Patent Abstracts of Japan of JP 2000–044851 Dated Feb. 15, 2000.

\* cited by examiner

Primary Examiner—Helene Klemanski
(74) Attorney, Agent, or Firm—Ladas & Parry

(57) ABSTRACT

A black ink set is provided which, in a middle to high lightness region of images, can improve image quality, especially lightfastness and gradation, and can reduce graininess. The black ink set comprises at least a first black ink composition and a second black ink composition, wherein the first black ink composition has a lightness (L*) in the range of 1 to 30 as calculated from the spectral transmittance of a 1000-fold dilution of the first black ink composition and the second black ink composition has an L* value in the range of 35 to 80 as calculated from the spectral transmittance of a 1000-fold dilution of the second black ink composition and contains a compound represented by formula (I) as a colorant:

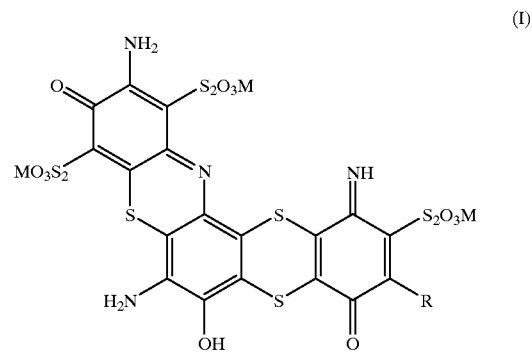

(I)

wherein R represents a $C_{1-6}$ alkyl group, a hydroxyl group, or a group $-NR^1R^2$ in which $R^1$ and $R^2$ each independently represent a hydrogen atom or a $C_{1-6}$ alkyl group; and M represents an alkali metal or a group $-NR^1R^2$ in which $R^1$ and $R^2$ each independently represent a hydrogen atom or a $C_{1-6}$ alkyl group.

14 Claims, No Drawings

BLACK INK SET AND INK JET RECORDING METHOD USING THE SAME

BACKGROUND OF THE INVENTION

1. Field of the Invention

The present invention relates to an ink set suitable for ink jet recording and an ink jet recording method, and more particularly to an ink set and an ink jet recording method which can realize images possessing excellent lightfastness and quality.

2. Background Art

Ink jet recording is a recording method wherein a recording liquid is ejected from fine nozzles provided on a recording head, for example, by vibration caused by a piezoelectric element or through the action of thermal energy to perform recording. The ink jet recording has advantages including quiet operation at the time of recording, recording of high-resolution images at a high speed through the use of a high-density head, and low running cost.

In the formation of color images by ink jet recording, at least three primary colors of yellow ink, magenta ink, and cyan ink, or four primary colors of yellow ink, magenta ink, cyan ink, and black ink are mainly used. Further, in recent years, a method has been proposed wherein a plurality of magenta inks different from each other in color density and a plurality of cyan inks different from each other in color density are used to yield higher definition images. The advance of such ink jet recording technology has realized the production of images having high quality comparable with photographs. This has lead to a tendency toward the use of output images in a wide variety of applications, and storage stability, such as lightfastness, of images is being regarded as important.

In order to improve the lightfastness of black images, Japanese Patent Laid-Open No. 44851/2000 proposes the incorporation of a dye or a pigment and a specific compound, and Japanese Patent Laid-Open No. 130557/1998 proposes the utilization of a specific black dye.

SUMMARY OF THE INVENTION

The present inventors have now found that the use of two black ink compositions, one of which contains a specific colorant, can realize images which possesses excellent lightfastness and, at the same time, have high quality comparable with photographs. The present invention has been made based on such finding.

Accordingly, it is an object of the present invention to provide an ink set which can realize images possessing excellent lightfastness and quality.

According to one aspect of the present invention, there is provided an ink set comprising at least a first black ink composition and a second black ink composition, wherein said first black ink composition has a lightness (L*) in the range of 1 to 30 as calculated from the spectral transmittance of a 1000-fold dilution of said first black ink composition, and said second black ink composition has an L* value in the range of 35 to 80 as calculated from the spectral transmittance of a 1000-fold dilution of said second black ink composition and contains a compound represented by formula (I) as a colorant:

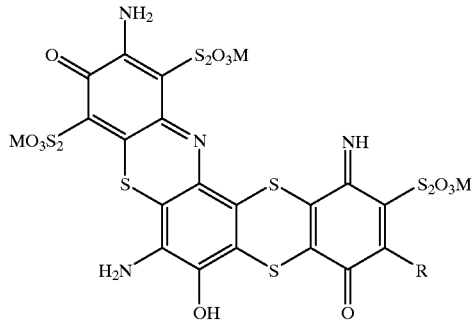

(I)

wherein

R represents a $C_{1-6}$ alkyl group, a hydroxyl group, or a group —$NR^1R^2$ in which $R^1$ and $R^2$ each independently represent a hydrogen atom or a $C_{1-6}$ alkyl group; and M represents an alkali metal or a group —$NR^1R^2$ in which $R^1$ and $R^2$ each independently represent a hydrogen atom or a $C_{1-6}$ alkyl group.

DESCRIPTION OF THE PREFERRED EMBODIMENTS

The ink set of the present invention can advantageously improve image quality, especially lightfastness and gradation, and can reduce graininess in a middle to high lightness region of images. Further, the ink compositions constituting the ink set according to the present invention, when used in combination with color inks, can yield good mixed images. In addition, the ink compositions constituting the ink set according to the present invention can satisfy various properties required of inks used in ink jet recording, for example, nozzle anti-clogging properties and storage stability.

The ink set according to the present invention comprises at least two ink compositions, that is, at least a first black ink composition and a second black ink composition.

The first black ink composition has a lightness (L*) in the range of 1 to 30 as calculated from the spectral transmittance of a 1000-fold dilution of the first black ink composition. On the other hand, the second black ink composition has an L* value in the range of 35 to 80, preferably 45 to 65, as calculated from the spectral transmittance of a 1000-fold dilution of the second black ink composition. In the present invention, an ink composition is diluted with water.

Further, according to the present invention, the second black ink composition contains the compound represented by formula (I) as a colorant. In formula (I), R represents a $C_{1-6}$ alkyl group (preferably a methyl group), a hydroxyl group, or a group —$NR^1R^2$ in which $R^1$ and $R^2$ each independently represent a hydrogen atom or a $C_{1-6}$ alkyl group and preferably $R^1$ and $R^2$ each represent a hydrogen atom. M represents an alkali metal (preferably sodium, lithium, or potassium) or a group —$NR^1R^2$ in which $R^1$ and $R^2$ each independently represent a hydrogen atom or a $C_{1-6}$ alkyl group. Specific examples of the compounds represented by formula (I) include compounds having the following structures represented by formulae (II) to (IV).

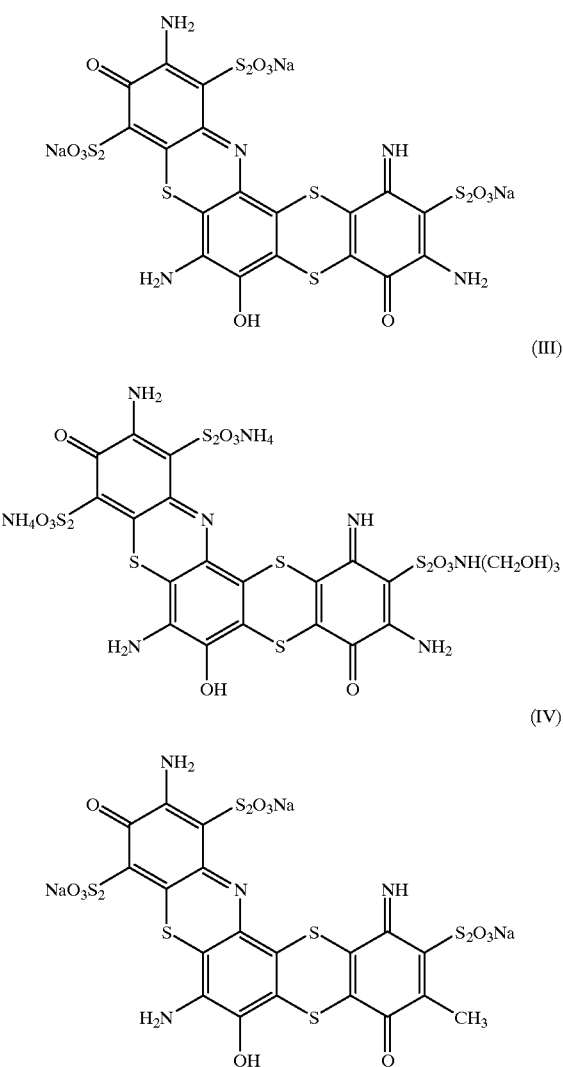

Specific examples of preferred compounds represented by formula (I) include water-soluble C.I. Sulfur Black 1. This dye is commercially available from Clariant under the designation Duasyn Black SU-SF liq VP 2287.

The amount of the compound represented by formula (I) added may be properly determined. However, the amount of this compound added is preferably 1 to 5% by weight based on the ink composition.

Any of dyes and pigments may be used as the colorant in the first black ink composition.

Dyes usable herein include those used as colorants in ink compositions for ink jet recording, for example, dyes which fall into categories of acidic dyes, direct dyes, basic dyes, reactive dyes, sulfur dyes, and food dyes according to the color index. Examples thereof include: C.I. Direct Black 19, C.I. Direct Black 22, C.I. Direct Black 51, C.I. Direct Black 56, C.I. Direct Black 71, C.I. Direct Black 74, C.I. Direct Black 75, C.I. Direct Black 77, C.I. Direct Black 154, C.I. Direct Black 168, and C.I. Direct Black 171; C.I. Acid Black 2, C.I. Acid Black 7, C.I. Acid Black 24, C.I. Acid Black 26, C.I. Acid Black 31, C.I. Acid Black 52, C.I. Acid Black 63, and C.I. Acid Black 112; and C.I. Reactive Black 3, C.I. Reactive Black 4, C.I. Reactive Black 7, C.I. Reactive Black 11, C.I. Reactive Black 12, C.I. Reactive Black 17 and C.I. Reactive Black 31. They may be used alone or as a mixture of two or more. Although the amount of these dyes added may be properly determined, the amount of these dyes added is preferably in the range of 4 to 7% by weight.

Any of inorganic pigments and organic pigments may be used as the pigment. The inorganic pigment may be carbon black produced by a conventional method. Organic pigments include azo pigments, phthalocyanine pigments, and anthraquinone pigments. These pigments may be used alone or as a mixture of two or more. These pigments may also be used as a mixture with dyes. The amount of these pigments added may be properly determined. The amount of these pigments added, however, is preferably in the range of 2.5 to 7% by weight.

The solvent in the first black ink composition and the solvent in the second black ink composition each preferably comprises water and a water-soluble organic solvent.

Water is preferably deionized water. The content of water may be properly determined depending upon the type and amount of organic solvents described below and the properties of desired ink compositions. In general, however, the water content is preferably in the range of 10 to 70% by weight based on the ink composition.

The water-soluble organic solvent is preferably a low-volatile solvent from the viewpoint of preventing clogging. Examples of preferred low-volatile solvents include: polyhydric alcohols, such as ethylene glycol, diethylene glycol, triethylene glycol, polyethylene glycol, propylene glycol, 1,3-propanediol, 1,5-pentanediol, 1,2-hexanediol, 1,2,6-hexanetriol, and glycerin; glycol ethers such as ethylene glycol monomethyl ether, ethylene glycol monobutyl ether, diethylene glycol monomethyl ether, diethylene glycol monobutyl ether, triethylene glycol monomethyl ether, triethylene glycol monobutyl ether, propylene glycol monomethyl ether, propylene glycol monobutyl ether, and dipropylene glycol monomethyl ether; nitrogen-containing solvents such as formamide, dimethylformamide, diethanolamine, triethanolamine, 1,3-dimethyl-2-imidazolidinone, 2-pyrrolidone, and N-methyl-2-pyrrolidone; and sulfur-containing solvents such as thiodiglycol and dimethyl sulfoxide. These water-soluble organic solvents may be used alone or as a mixture of two or more. The amount of the water-soluble organic solvent added may be properly determined. The amount of the water-soluble organic solvent added, however, is preferably about 3 to 40% by weight from the viewpoint of clogging and print quality.

Further, according to a preferred embodiment of the present invention, the first black ink composition and the second black ink composition contain an acetylene glycol nonionic surfactant or a lower alkyl ether of a glycol compound. The incorporation of both the acetylene glycol nonionic surfactant and the lower alkyl ether of a glycol compound is more preferred from the viewpoint of realizing feathering-free images.

The acetylene glycol nonionic surfactant may be commercially available one, and examples thereof include Olfine E 1010, Olfine STG, and Surfynol 104 E (all the above products being available from Nissin Chemical Industry Co., Ltd.). The amount of the acetylene glycol nonionic surfactant added is preferably in the range of 0.01 to 3% by weight based on the total weight of the ink.

Examples of preferred lower alkyl ethers of glycol compounds include diethylene glycol monobutyl ether, triethylene glycol monobutyl ether, propylene glycol monobutyl ether, and dipropylene glycol monobutyl ether. Although the amount of the lower alkyl ether of a glycol compound added may be properly determined, the amount of this lower alkyl ether added is preferably about 3 to 40% by weight, more preferably 3 to 30% by weight.

According to a preferred embodiment of the present invention, the first black ink composition and the second black ink composition contain various optional additives which impart desired properties to the inks. Specific examples of optional additives usable herein include viscosity modifiers, such as sodium alginate and polyvinyl alcohol, hydroxides of alkali metals, such as potassium hydroxide, sodium hydroxide, and lithium hydroxide, pH adjustors, such as ammonium phosphate, preservatives (for example, Proxel XL-2 manufactured by Avecia), rust preventives, antioxidants, antimolds, and chelating agents.

The ink set according to the present invention may be used in monochromic printing, or may be used in combination with yellow ink, magenta ink, and cyan ink to constitute a color ink set which is used in color printing. Alternatively, a method may be adopted wherein two magenta ink compositions different from each other in color density and two cyan ink compositions different from each other in color density are provided, are combined with yellow ink, and are further combined with the ink set according to the present invention. The ink set according to the present invention, which has been combined with color inks other than yellow ink, magenta ink, and cyan ink, falls within the scope of the present invention.

The ink set according to the present invention may be used in recording methods using an ink composition. Recording methods using an ink composition include, for example, an ink jet recording method, a recording method using writing utensils, such as pens, and other various printing methods. In particular, the ink composition according to the present invention is preferably used in an ink jet recording method wherein droplets of an ink composition are ejected and deposited onto a recording medium. The ink jet recording method may be any of a method wherein the vibration of a piezoelectric element is utilized to eject ink droplets, a method wherein thermal energy is utilized, and other type of ink jet recording methods.

EXAMPLES

The present invention will be described in more detail with reference to the following examples, though it is not limited to these examples only.

The following abbreviations are used in the following description.

TEGmBE: triethylene glycol monobutyl ether,
DEGmBE: diethylene glycol monobutyl ether,
TEG: triethylene glycol,
DEG: diethylene glycol,
GL: glycerin,
TEA: triethanolamine, and
EDTA: disodium ethylenediamine tetraacetate.

Values of the spectra transmittance of 1000-fold dilution of ink compositions are measured as follows:

Apparatus: Spectrophotometer U-3300 (manufactured by Hitachi)
Cell: Quartz Cell (1 cm)
Light: D65
Angle of visibility: 2 degrees Preparation of Ink Compositions (1) First Black Ink Composition Inks A and B were prepared according to the formulations specified in Table 1 below. Specifically, the ingredients indicated in Table 1 were mixed together, and the mixtures were filtered under pressure through a membrane filter with a pore diameter of 1 $\mu$m to prepare ink compositions.

TABLE 1

| Ink | A | B |
|---|---|---|
| C.I. Direct Black 195 | 5 | |
| Black X 34 (product of BASF) | | 3 |
| TEGmBE | | 10 |
| TEG | 5 | |
| DEG | | 5 |
| GL | 10 | 10 |
| 1,2-Hexanediol | 5 | |
| 2-Pyrrolidone | 5 | 2 |
| TEA | 1 | 1 |
| Olfine E 1010 | 0.5 | 1 |
| Olfine STG | 0.2 | |
| EDTA | 0.05 | 0.02 |
| Proxel XL-2 | 0.3 | 0.3 |
| Ion-exchanged water | Balance | Balance |
| Lightness of 1000-fold dilution of ink | 10.5 | 12.6 |

Further, the following black ink compositions were provided as inks C, D, and E.

Ink C: Dye-based black ink composition for an ink jet printer PM-800C manufactured by Seiko Epson Corporation (Lightness of 1000-fold dilution: 6.2)

Ink D: Dye-based black ink composition for an ink jet printer BJ F 870 manufactured by Canon Inc. (Lightness of 1000-fold dilution: 24.5)

Ink E: Pigment-based black ink composition for an ink jet printer Desk Jet 970Cxi manufactured by Hewlett Packard Co. (Lightness of 1000-fold dilution: 16.5)

(2) Second Black Ink Composition

Inks a to g were prepared according to the formulations specified in Table 2 below. Specifically, the ingredients indicated in Table 2 were mixed together, and the mixtures were filtered under pressure through a membrane filter with a pore diameter of 1 $\mu$m to prepare ink compositions.

TABLE 2

| Ink | a | b | c | d | e | f | g |
|---|---|---|---|---|---|---|---|
| Duasyn Black SU-SF | 4 | | 3 | | | | |
| Dye of formula (IV) | | 5 | | | | | |
| C.I. Reactive Black 31 | | | | 2.5 | | 4 | |
| C.I. Food Black 2 | | | | | 2 | | 4 |
| TEGmBE | 10 | | | 10 | | 10 | 10 |
| TEG | 8 | | | 10 | 10 | 8 | 8 |
| DEG | | 7 | 10 | | | | |
| GL | 10 | 10 | 10 | 10 | 10 | 10 | 10 |
| 1,5-Pentanediol | | 1 | 1 | | | | |
| 1,2-Hexanediol | | 5 | 5 | | 5 | | |
| 2-Pyrrolidone | 2 | 2 | 2 | | | | |
| TEA | 0.3 | | | 0.3 | | 0.3 | 0.3 |

TABLE 2-continued

| Ink | a | b | c | d | e | f | g |
|---|---|---|---|---|---|---|---|
| Olfine E 1010 | 0.8 | | | 0.8 | | 0.8 | 0.8 |
| Olfine STG | | 0.5 | 0.5 | | 0.5 | | |
| EDTA | 0.05 | 0.05 | 0.02 | 0.01 | 0.01 | 0.01 | 0.02 |
| Proxel XL-2 | 0.3 | 0.3 | 0.3 | 0.3 | 0.3 | 0.3 | 0.3 |
| Ion-exchanged water | Balance | Balance | Balance | Balance | Balance | Balance | Balance |
| Lightness of 1000-fold dilution of ink | 55.7 | 47.0 | 64.6 | 75.0 | 35.3 | 32.7 | 15.1 |

Evaluation of Ink Compositions

The first black ink composition was combined with the second black ink composition as follows. The combinations were evaluated by the following tests.

Printing conditions in the test were as follows.

Ink jet printer: PM-800C (manufactured by Seiko Epson Corporation)

recording media:
  Recording paper 1: Xerox 4024 (plain paper, manufactured by Xerox Corp.)
  Recording paper 2: Superfine specialty paper (manufactured by Seiko Epson Corporation)
  Recording paper 3: Photo-Print paper (manufactured by Seiko Epson Corporati)
  Recording paper 4: PM Photo-Print paper (manufactured by Seiko Epson Corporati)

TABLE 3

| Example | First ink | Second ink |
|---|---|---|
| 1 | A | a |
| 2 | B | a |
| 3 | C | a |
| 4 | D | a |
| 5 | E | a |
| 6 | C | b |
| 7 | C | c |
| 8 | C | d |
| 9 | C | e |
| 10 | E | b |
| 11 | E | c |
| 12 | E | d |
| 13 | C | f |
| 14 | C | g |
| 15 | C | c |

Evaluation 1: Image Quality (Graininess)

In an ink jet printer, a deep cyan ink tank was filled with the first black ink, and a light cyan ink tank was filled with the second black ink. A gradation pattern wherein, in a cyan color, a range from a solid color constituted by 100% duty deep cyan to density zero (0) had been divided into 256 gradations, that is, a gradation pattern ranging from black to white, was printed as print data.

For the prints thus obtained, the visibility of ink dots was evaluated in terms of graininess according to the following criteria.

For Example 16, color mixing was carried out using color inks for an ink jet printer PM 800C to print the same gradation pattern ranging from black to white as described above.

A: Dots unnoticeable
B: Dots hardly noticeable
C: Dots noticeable

Evaluation 2: Gray Balance (Gradation)

Hue (a*, b*) in each gradation of the gradation patterns prepared in the evaluation 1 was measured, and a difference in hue, $\Delta C^*$, from a solid color constituted by 100% duty first black ink was determined from the following equation, and was evaluated according to the following criteria:

$$\Delta C^* = ((\Delta a^*)^2 + (\Delta b^*)^2)^{1/2}$$

A: $\Delta C^*$ was not more than 2 in all the gradation points.
B: For $\Delta C^*$, the maximum value was not more than 4, and the average was not more than 2.
C: For $\Delta C^*$, the maximum value was less than 5, and the average was not more than 3.
D: For $\Delta C^*$, the maximum value was not less than 5, and the average was more than 3.

Evaluation 3: Lightfastness

Light was applied by means of a xenon weather-o-meter Ci-35A (manufactured by Atlas Electric Device) to prints of recording papers 3 and 4 among the gradation patterns prepared in the evaluation 1 for 200 hr. In this case, hue (L*, a*, b*) of the 128th gradation portion (intermediate portion) was measured before and after the light irradiation by means of a GRETAG densitometer SPM-50 (manufactured by GRETAG, Ltd.), followed by the determination of the difference between color before the light irradiation and color after the light irradiation, $\Delta E^{*ab}$, by the following equation. The lightfastness was evaluated from the results according to the following criteria.

$$\Delta E^{*ab} = [(\Delta L^*)^2 + (\Delta a^*)^2 + (\Delta b^*)^2]^{1/2}$$

A: $\Delta E^{*ab}$ of not more than 5
B: $\Delta E^{*ab}$ of more than 5 to 10
C: $\Delta E^{*ab}$ of more than 10 to 20
D: $\Delta E^{*ab}$ of more than 20

Evaluation 4: Recovery from Nozzle Clogging

Inks a to g were charged into an ink tank for a black ink composition of Ink Jet Printer PM-800C and ejection of the ink through all nozzles was confirmed by printing. Thereafter, the printer was allowed to stand without capping under an environment of 40° C. for one month. After the one-month standing, the power supply of the printer was turned on, and the number of cleaning operations required for all the nozzles to normally eject the ink was counted. The recovery from nozzle clogging was evaluated based on the number of cleaning operations according to the following criteria.

A: Recovered by performing the cleaning operation once,
B: Recovered by repeating the cleaning operation twice or three times,
C: Recovered by repeating the cleaning operation four to six times, and
D: Not recovered even by repeating the cleaning operation six times.

Evaluation 5: Ejection Stability (Long-time Continuous Recording)

Inks a to g were charged into an ink tank for a black ink composition of Ink Jet Printer PM-800C. Under three levels of temperature environment of 5° C., 20° C., and 40° C., printing was continuously carried out for 48 hr. In this case, dropouts of dots and scattering of ink were evaluated according to the following criteria.

A: For all the temperatures, dropouts of dots did not take place, and printing was stable.

B: For any one of the temperatures, dropouts of dots began to take place with the elapse of time.

C: For any one of the temperatures, dropouts of dots took place from the early stage.

The results of evaluations 1 to 5 were as summarized in the following tables.

TABLE 4

| Recording paper | Evaluation 1 | | | | Evaluation 2 | | | | Evaluation 3 | |
|---|---|---|---|---|---|---|---|---|---|---|
| | 1 | 2 | 3 | 4 | 1 | 2 | 3 | 4 | 3 | 4 |
| Example 1 | A | A | A | A | A | A | A | A | A | A |
| Example 2 | A | A | A | A | A | A | A | A | A | A |
| Example 3 | A | A | A | A | A | A | A | A | A | A |
| Example 4 | A | A | A | A | A | A | A | A | A | A |
| Example 5 | A | A | A | A | A | A | A | A | A | A |
| Example 6 | A | A | A | A | A | A | A | A | A | A |
| Example 7 | A | A | A | A | A | A | A | A | A | A |
| Example 8 | A | A | A | A | A | B | B | C | D | C |
| Example 9 | B | B | B | B | A | A | A | A | D | D |
| Example 10 | A | A | A | A | A | A | A | A | A | A |
| Example 11 | A | A | A | A | A | A | A | A | A | A |
| Example 12 | A | A | A | A | A | B | B | C | D | D |
| Example 13 | B | C | C | C | B | D | D | D | C | B |
| Example 14 | C | C | C | C | B | B | C | D | D | D |
| Example 15 | C | C | C | C | B | B | B | B | D | C |
| Example 16 | A | A | A | A | B | C | C | B | D | C |

TABLE 5

| Ink | Evaluation 4 | Evalaution 5 |
|---|---|---|
| a | A | A |
| b | A | A |
| c | A | A |
| d | A | A |
| e | A | A |
| f | A | A |
| g | B | B |

What is claimed is:

1. An ink set comprising a first black ink composition and a second black ink composition, wherein said first black ink composition has a lightness (L*) in the range of 1 to 30 as calculated from the spectral transmittance of a 1000-fold dilution of said first black ink composition, and said second black ink composition has an L* value in the range of 35 to 80 as calculated from the spectral transmittance of a 1000-fold dilution of said second black ink composition and contains a compound represented by formula (I) as a colorant:

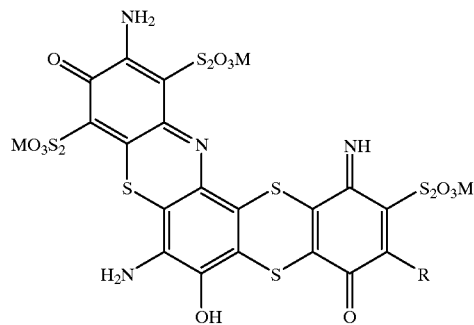

(I)

wherein

R represents a $C_{1-6}$ alkyl group, a hydroxyl group, or a group —$NR^1R^2$ in which $R^1$ and $R^2$ each independently represent a hydrogen atom or a $C_{1-6}$ alkyl group; and M represents an alkali metal or a group —$NR^1R^2$ in which $R^1$ and $R^2$ each independently represent a hydrogen atom or a $C_{1-6}$ alkyl group.

2. The ink set according to claim 1, wherein said second black ink composition has an L* value in the range of 45 to 65 as calculated from the spectral transmittance of a 1000-fold dilution of said second black ink composition.

3. The ink set according to claim 1, wherein the colorant represented by formula (I) is C.I. Sulfur Black 1.

4. The ink set according to claim 3, wherein C.I. Sulfur Black 1 is soluble in water.

5. The ink set according to claim 3, wherein the content of said C.I. Sulfur Black 1 is 1to 5% by weight based on the ink composition.

6. The ink set according to claim 1, wherein the first and/or second ink composition contains a lower alkyl ether of a glycol compound.

7. The ink set according to claim 6, wherein the lower alkyl ether of the glycol compound is at least one member selected from the group consisting of diethylene glycol monobutyl ether, triethylene glycol monobutyl ether, propylene glycol monobutyl ether, and dipropylene glycol monobutyl ether.

8. The ink set according to claim 6, wherein the content of the lower alkyl ether of the glycol compound is 3to 30% by weight based on the ink composition.

9. The ink set according to claim 1, wherein the first and/or second ink composition contains an acetylene glycol nonionic surfactant.

10. The ink set according to claim 9, wherein the content of the acetylene glycol nonionic surfactant is 0.01 to 3% by weight based on the ink composition.

11. The ink set according to claim 1, which is used in ink jet recording.

12. A recording method comprising the step of depositing an ink composition onto a recording medium to perform printing, the ink composition being an ink composition in the ink set according to claim 1.

13. An ink jet recording method comprising the steps of: ejecting droplets of an ink composition; and depositing the droplets onto a recording medium to perform printing, the ink composition being an ink composition in the ink set according to claim 1.

14. A record produced by the recording method according to claim 12.

* * * * *